United States Patent [19]

Butcher

[11] 4,244,717
[45] Jan. 13, 1981

[54] SYSTEM FOR COLLECTING SOLID PARTICLES ENTRAINED IN A GAS STREAM

[75] Inventor: Robert W. Butcher, Dayton, Ohio

[73] Assignee: General Motors Corporation, Detroit, Mich.

[21] Appl. No.: 961,042

[22] Filed: Nov. 15, 1978

[51] Int. Cl.³ ............................................. B01D 46/02
[52] U.S. Cl. ........................................ 55/364; 55/366; 55/373
[58] Field of Search ................... 55/97, 364, 373, 378, 55/319, 366

[56] References Cited

U.S. PATENT DOCUMENTS

| | | | |
|---|---|---|---|
| 2,133,141 | 10/1938 | Holm-Hansen | 55/366 |
| 2,651,383 | 9/1953 | Yonkers, Jr. | 55/273 |
| 2,697,512 | 12/1954 | Brown | 55/364 |
| 2,714,426 | 8/1955 | White | 55/366 |
| 3,373,545 | 3/1968 | Christianson | 55/373 |
| 3,473,300 | 10/1969 | Wilm et al. | 55/302 |
| 3,541,764 | 11/1970 | Astrom | 55/302 |
| 3,861,893 | 1/1975 | Smith et al. | 55/302 |
| 3,887,343 | 6/1975 | Margraf | 55/262 |
| 3,892,543 | 7/1975 | Margraf | 55/96 |
| 4,097,251 | 6/1978 | Murayama et al. | 55/97 |

*Primary Examiner*—Norman Yudkoff
*Attorney, Agent, or Firm*—D. D. McGraw

[57] ABSTRACT

A dust and particle separating and collecting system including a bag and bag support which receives the solid material. The bag acts as a separator as well as a container unit. The material is gathered by entrainment in a gas stream, usually air, and separated and collected in the system. The bag may be used for disposal of the material collected if it is waste material.

8 Claims, 10 Drawing Figures

SYSTEM FOR COLLECTING SOLID PARTICLES ENTRAINED IN A GAS STREAM

The invention relates to a system installed in a manufacturing, processing or generating facility which has material either capable of being, or likely to be, suspended in a gas stream, and particularly air. Examples of such materials are waste material such as paper particles, industrial dust particles, grain dust, brake lining materials, sawdust and shavings. Other materials such as coal or limestone may be collected for salvage and use. The invention also particularly relates to a disposal unit for waste material, including a bag trapping and containing the waste material and a rigid container support form holding the bag while it is installed as a part of the system and also providing support for transportation of the bag to a disposal site. When the collected particles are to be salvaged, the bag or the bag and support form unit may be used for storage. Although the description is hereafter directed to waste material collection, it is intended that the scope of the invention include collection of other materials which are salvageable and usable either in the same work area or in another application. For example, a steel mill would collect limestone particles and use them in the steel-making process. Fly ash could be cooled, collected, and used as a filler in certain plastics. Coal dust could be recaptured and used as a fuel.

It has been well-known in prior systems to utilize dust separators known as cyclones and bag houses to separate airborne waste material and dispose of the material in some manner. The invention herein described and claimed is embodied in any of several different system arrangements utilizing a bag and bag container for collection of the waste material. In one of the systems, the waste material is collected from various waste material generating stations and transmitted to cyclones where much of it is separated out, some of the material being transmitted from the discharge of the cyclones and the other material being directly transmitted to a disposal bag and container unit for final collection. Any waste material still entrained in the gas stream is passed through a bag house, this material being intermittently collected and re-entrained in the gas stream so that it has additional opportunities to be collected in the bag and container unit. The arrangement utilizing several sets of cyclones has been found to be satisfactory and is utilized when it is economically advantageous to continue using a bag house of smaller capacity because the bag house is already installed. If a bag house of somewhat larger capacity is available, some or all of the cyclones may be eliminated. If a bag house of sufficient size may be installed or is already available, it is preferable to install this system utilizing only the bag house and the disposable bag and container unit. This eliminates the cost, maintenance and servicing of the cyclones.

It is a particular feature of the invention to provide a disposable bag which will collect waste material and substantially fill the bag. This is accomplished by providing an inlet for the bag which conducts an air mass with waste material entrained therein into the top part of one end of the bag at a relatively high velocity. Once it enters the bag the velocity of the air mass and entrained material decreases dramatically. The bag is provided with an outlet opening in the bag top. The outlet opening is much larger than the inlet opening so that the same air mass quantity may be exhausted from the bag but at a very low velocity, thereby permitting the waste material entrained in the air as it entered the bag to settle out by gravity so that the air discharged from the bag is substantially waste free. This discharged air will have a relatively small amount of waste material entrained therein and is therefore conducted to the bag house to separate that waste material from the air. This material is intermittently collected and re-entrained in the air mass before it enters the bag. In some systems it is desirable to initially circulate the air mass with the entrained waste material to the bag house, removing the waste material while re-entraining it in a flowing air mass, and transmitting the waste material to the disposable bag. Any small amount of waste material entrained in air passing out of the disposable bag is recirculated to the bag house. The system will use a balancing fan which exhausts clean air to atmosphere from the bag house. The balancing fan keeps the air masses being circulated through the system at a proper balance.

It is another feature of the invention to provide a disposable bag and rigid container support unit which is installed in the system and connected to the system to collect waste material. When the bag is filled to the appropriate extent the bag inlet and outlet openings are secured tightly so that no waste material may be exhausted. The unit is then placed on a truck chassis and transported to the disposal site. The rigid container support has an open top and gates at the rear end. The gate tops are sufficiently lower than the inlet opening of the bag so that they at no time interfere with connection and disconnection of the inlet collar with the waste disposal system. Once having been transported to the disposal site, the gates are opened and the unit is tilted up with a dump mechanism on the truck so that the bag slides out of the container support. The bag may then be covered in due course in the manner normally followed at the disposal site. The truck with the rigid container support is returned to the facility where waste material is generated, a new bag is secured therein, and the unit may then be installed in the system to collect more waste material.

IN THE DRAWINGS

Figure 1:
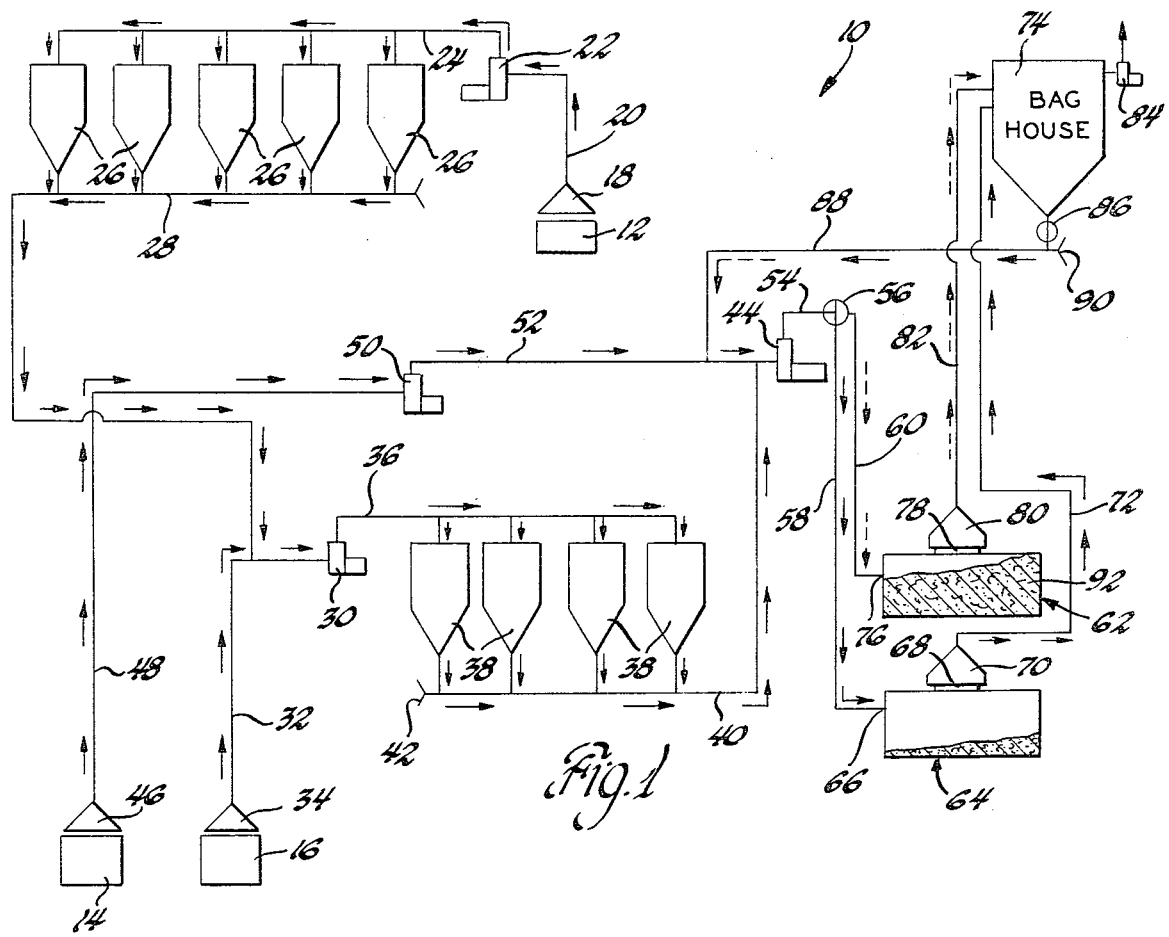
FIGS. 1, 2 and 3 are schematic representations of systems embodying the invention.

FIG. 1 is a schematic representation of a system utilizing two sets of cyclones, a relatively small bag house, and two container units, each unit including a disposable bag and a rigid support formed to the bag. The system 10 is illustrated as having several waste material generating stations 12, 14 and 16. It will be understood that any reasonable number of waste material generating stations may be served by the system, and that the material may be collected for use or reuse instead of disposal. The generating stations 12, 14 and 16 may be considered to be representative of entire work departments within a plant.

Considering first the waste material generated at generating station 12 and the structure which handles it, an exhaust hood 18 is connected by a duct 20 to a fan 22. The fan pulls in air through the exhaust hood and also entrains waste material in the air. The fan exhausts the air with the entrained waste material through duct 24 to the inlets of several cyclones 26. Five such cyclones are schematically illustrated. The cyclones are in parallel, each with their outlets connected to a duct 28. In a typical installation, fan 22 may have a capacity of about 15,000 cubic feet per minute (cfm). The cyclones 26 will discharge part of the air to atmosphere, depositing waste material which is entrained in the air passing through duct 28. This duct is connected to the inlet of another fan 30. A duct 32 connects the exhaust hood 34 of the waste material generating station 16 to the inlet side of fan 30. Fan 30 may have about the same capacity as fan 22. The air with entrained waste material is exhausted from fan 30 through duct 36 and delivered to the inlets of cyclones 38. Four such cyclones are illustrated in the schematic drawing. The outlets of cyclones 38 are connected to a duct 40. The duct 40 has a bell mouth at its open end 42 which can receive atmospheric air so that atmospheric air is pulled through duct 40 past the outlets of cyclones 38 by fan 44 to which duct 40 is connected. Duct 28, earlier described, may have a similar bell mouth and open end.

The waste material generating station 14 is illustrated as having an exhaust hood 46 connected to a duct 48 which leads to the inlet of another fan 50. Another duct 52 connects the outlet of fan 50 with the inlet of fan 44. Thus, the air mass and waste material entrained therein from waste material generating station 14 is transported through ducts and fans directly to the fan 44, joining with the air mass and waste material received from cyclones 38 through duct 40.

The outlet of fan 44 is connected to a duct 54. A Y-type two-way valve 56 is connected to duct 54 so that the valve receives air mass and waste material through duct 54. The valve has one inlet and two outlets. One outlet is connected to duct 58 and the other outlet is connected to duct 60. Valve 56 is so arranged that air mass and waste material from duct 54 may be directed either to duct 58 or to duct 60.

Figure 5:
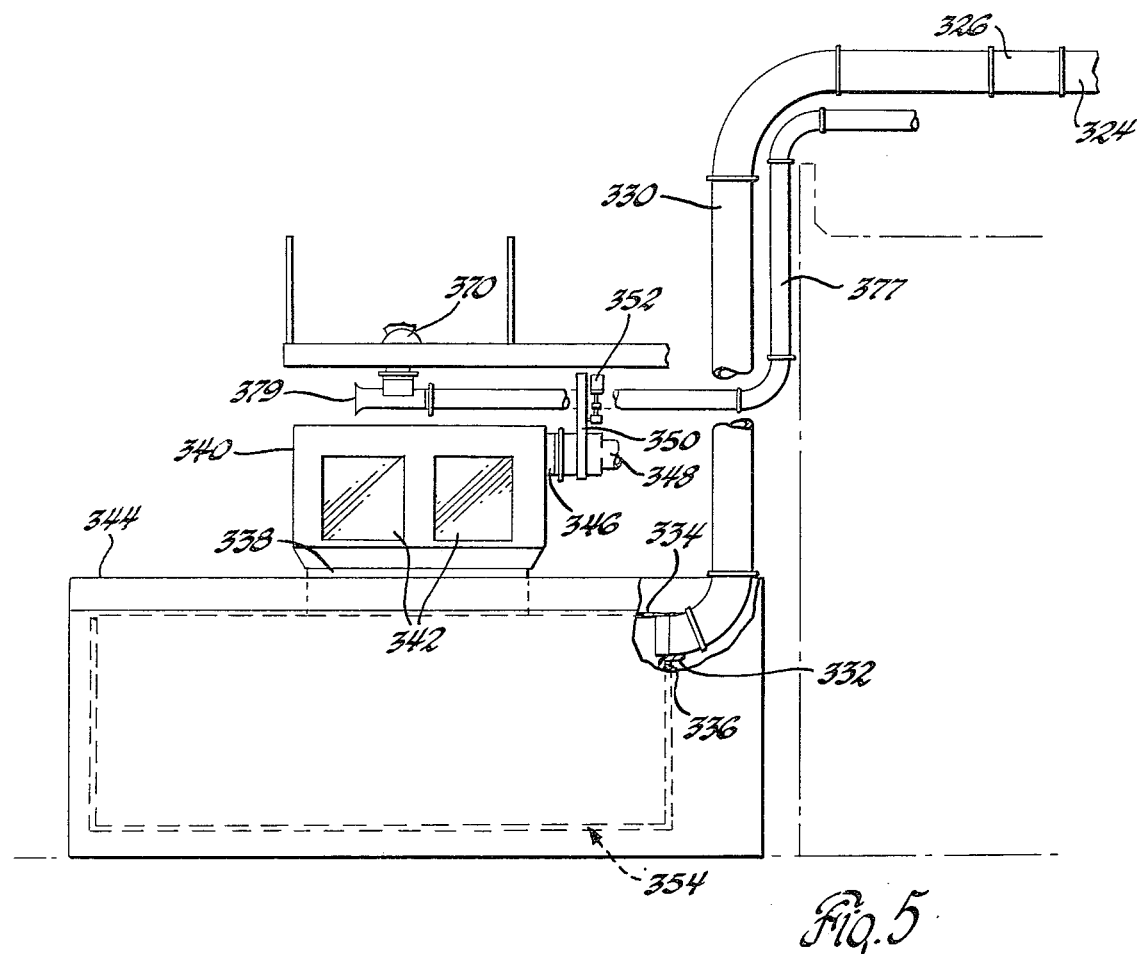
FIG. 5 is an elevated view of a portion of the system shown in FIG. 4 taken in the direction of arrows 5—5 of that Figure and having parts broken away and in section.
Figure 6:
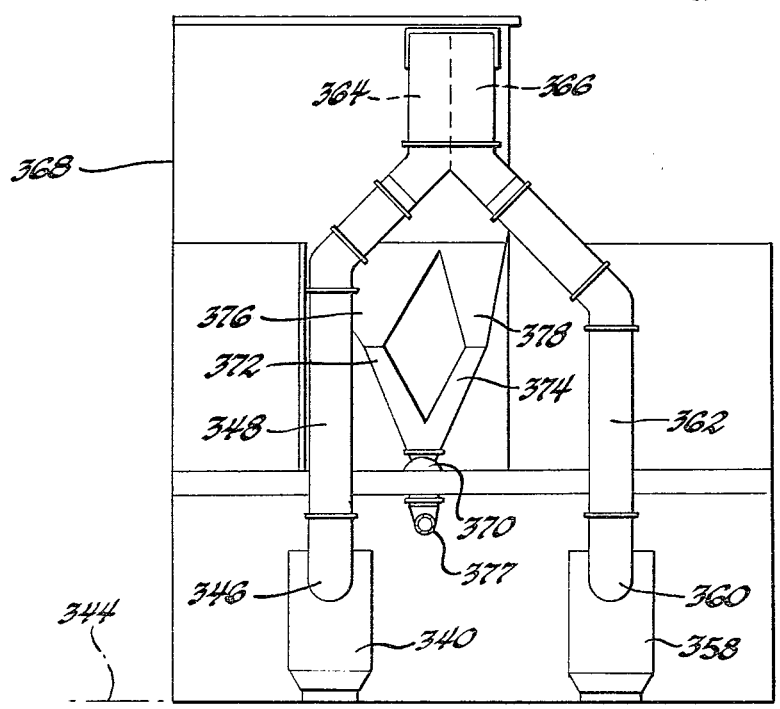
FIG. 6 is an elevation view of a portion of the system shown in FIG. 4 taken in the direction of arrows 6—6 of that Figure.
Figure 7:
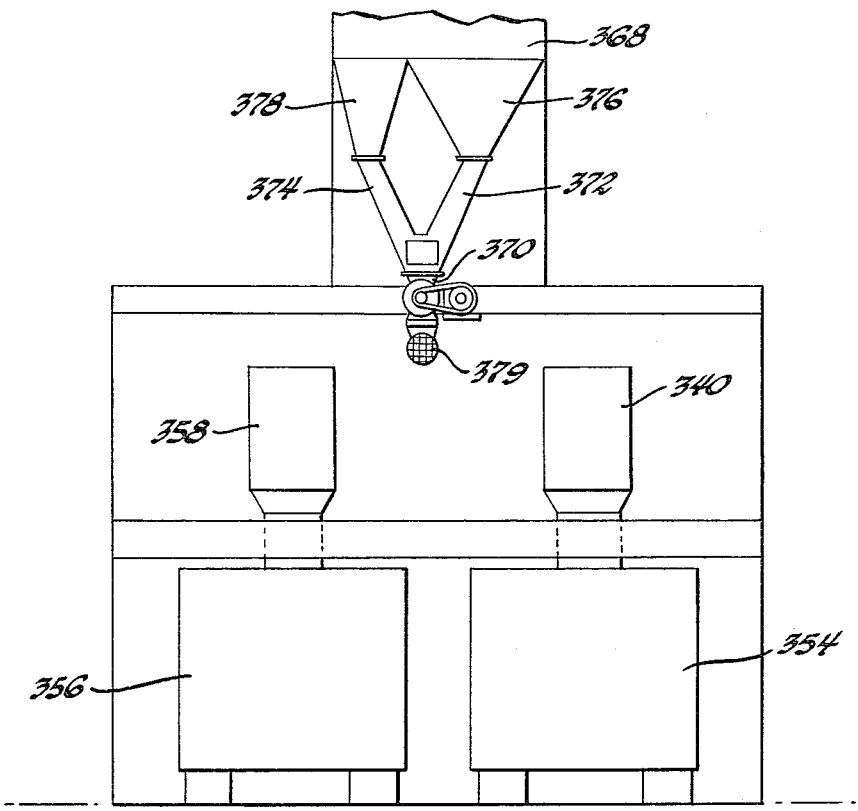
FIG. 7 is an elevation view of a portion of the system shown in FIG. 4 taken in the direction of arrows 7—7 of that Figure.
Figure 8:
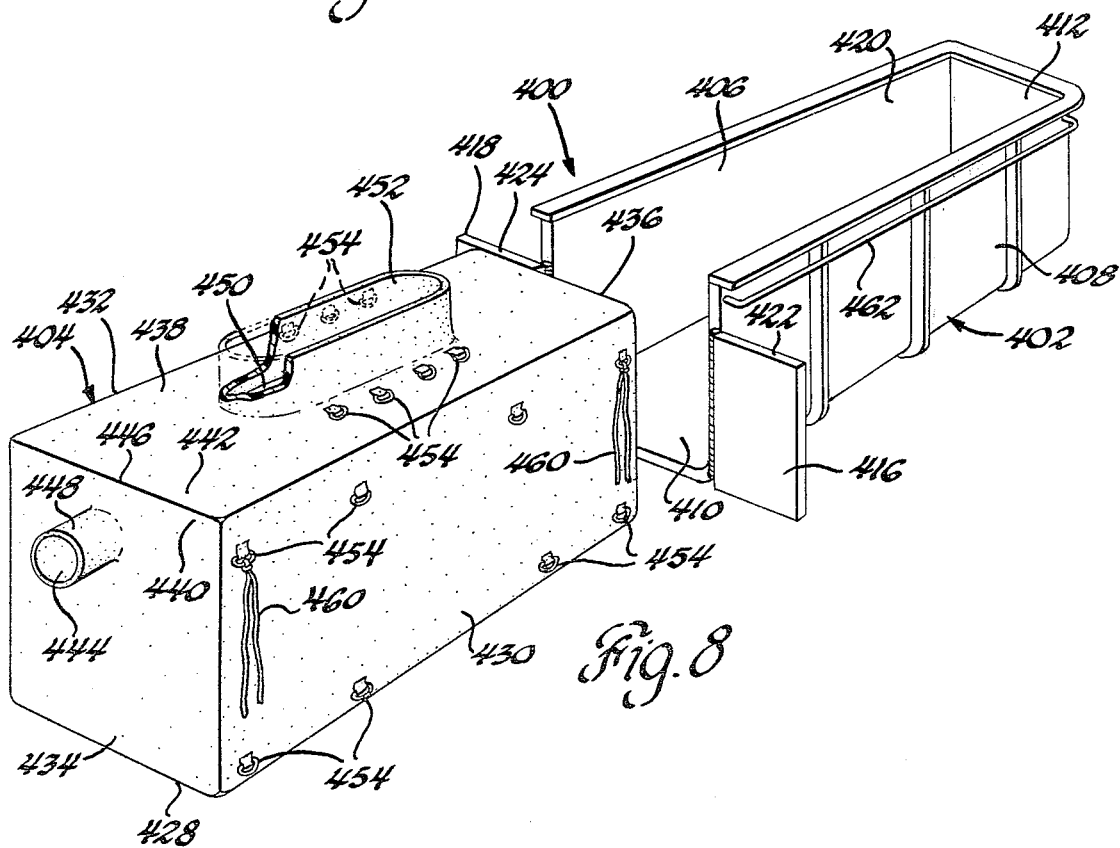
FIG. 8 is a perspective view of a bag and a support form embodying the invention with parts broken away and in section.

The system is illustrated as having two drop-out box and waste material removal units 62 and 64 installed. These units are illustrated in detail in other figures of the drawings, particularly FIGS. 5, 8 and 9. For purposes of the schematic illustration of FIGS. 1–3, the units are only generally described. Each unit consists of a disposable bag and a rigid container support form for the bag. The bag is provided with an inlet 66 and an outlet 68. As will be described in greater detail, the bag inlet is in one end and at the upper portion of the end adjacent to the top of the bag. The bag outlet is formed in the top of the bag and the bag is much larger in cross-section area than the inlet. Duct 58 is connected to bag inlet 66 of bag and container unit 64. The outlet 68 of unit 64 is connected to the bag exhaust hood 70, which is connected to duct 72 leading to an inlet for bag house 74. Unit 62 is similarly arranged, with its bag inlet 76 being connected to duct 60 and its outlet 78 being connected to the bag exhaust hood 80. A duct 82 connects the bag exhaust hood 80 with another inlet to bag house 74. The bag house is provided with a balancing fan 84 receiving air from the bag house and exhausting clean air to atmosphere. In a typical arrangement in FIG. 1, the bag house 74 may have a capacity of approximately 5,000 cfm.

The bag house provides for collection of waste material at the bottom of the bag house. The discharge duct of the bag house has a rotary air lock 86 in the duct.

Waste material separated from the air mass by bag house 74 is gathered at the bottom of the bag house when the bag house is shaken or reverse flushed. Rotary air lock 86 is normally closed. It is opened to remove the waste material from the lower parts of the bag house. The outlet side of rotary air lock 86 is connected to duct 88, which leads to the inlet side of fan 44. A bell mouth 90 is provided in the upstream end of duct 88 beyond the point of connection with air lock so as to permit some atmospheric air to enter the duct 88 with the waste material from the bag house 74. Thus, the waste material being removed from the bag is entrained in air moving through duct 88 from the bell mouth 90. The waste material so removed passes through fan 44 and is directed by valve 56 to one of the units 62 or 64, where it is deposited. For illustrative purposes, unit 62 is indicated as having just recently been filled so that valve 56 has been shifted to direct air and waste material to unit 64. Shifting of valve 56 may be done manually, but is preferably controlled automatically by sensing the filled condition of the unit being filled. The waste material 92 in unit 62 is shown as substantially filling the bag of unit 62. The illustration also clearly shows the manner in which the bag is filled. The air mass and waste material enters one end of the bag near the top thereof so that the waste material settles in the bag as the velocity of the air mass and the waste material dramatically decreases. The air mass passes through the bag outlet 78 at the top of the bag at a relatively low velocity, having turned about 90° upward relative to its point of entry, entraining relatively little waste material therein. In the system illustrated and particular bag unit used it is desirable that the air mass and waste material enter the bag at approximately 5,000 cfm, and leave the bag at substantially the same volumetric flow rate. However, the linear flow velocity at the bag outlet is substantially less than the velocity at the bag inlet. The velocity or linear flow rate of the air and material entering the bag in the particular example described, when the material is paper dust and particles having a density of 9 to 10 pounds per cubic foot, may be approximately 3,000 feet per minute. The velocity at the outlet of the bag is preferably on the order of 150 feet per minute. For more dense material, such as limestone dust with a density of about 30 pounds per cubic foot, higher velocities will be used. By providing a much larger outlet than inlet, the same cubic feet per minute volume of air mass is permitted to flow in and out of the bag. As the air and entrained waste material enters the bag, the waste material tends to settle at the bottom of the bag beginning at the far end so that the waste material deposited within the bag fills up at a slight incline in the manner illustrated in the two units. Due to the particular location of the inlet in the top part of one end, and the location outlet in the center of the top, the bag may be substantially filled as is illustrated by unit 62. It has been found that prior bags utilized to store waste material in a somewhat similar system did not permit the collection of nearly as much waste material as the bags utilized in the invention herein disclosed and claimed. In such prior systems conveyors from the cyclones and bag house tended to distribute the waste material unevenly in a typical bag with a fill inlet at the top. Even though a bag measuring 22 feet long by 8 feet high by 7 feet wide was used, paper waste material so collected amounted to only about 3,200 pounds per bag. This required the use of many bags in the particular system being used. When the system and bag herein disclosed and claimed were put into operation, the bag (of the same dimensions) would receive and collect approximately 13,000 to 16,000 pounds of the same type of waste material. Therefore, the system only required one bag every four or five days of operation while in the prior arrangement as many as three bags per day were required.

Figure 2:
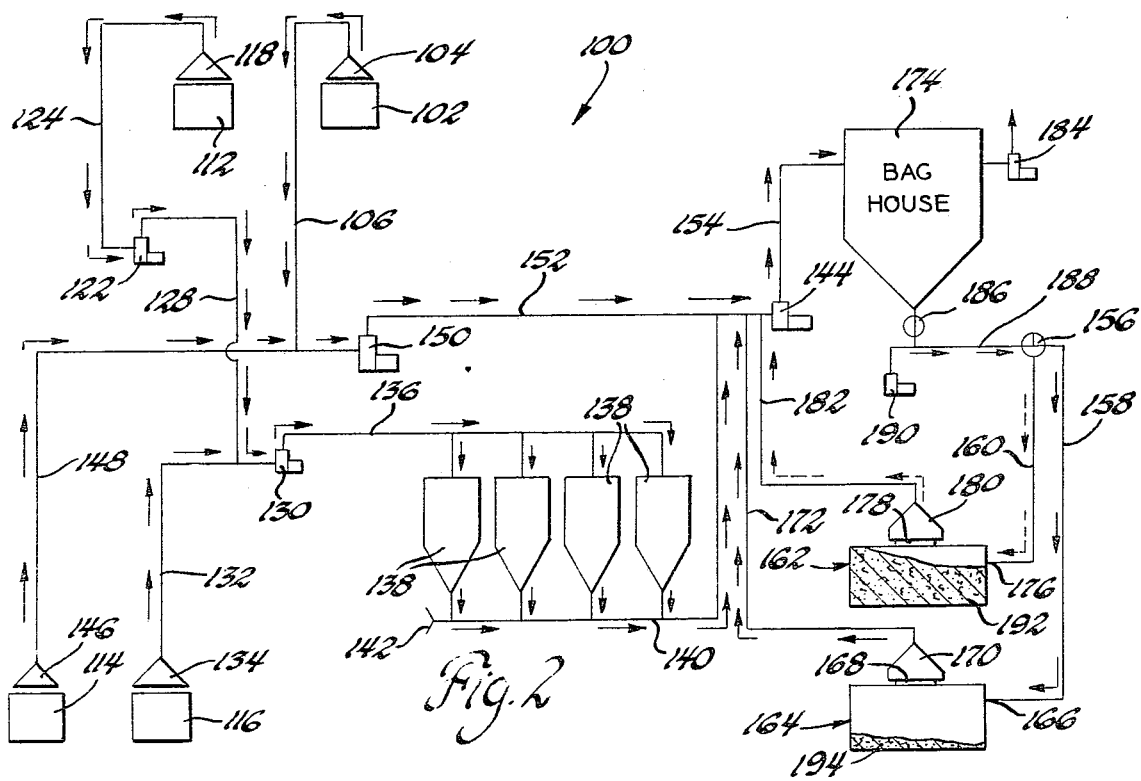

The system 100 of FIG. 2 is closely related to the system 10 of FIG. 1 but has only one set of cyclones. Also, the waste material separated by the cyclones is first transmitted through the bag house and then to the units which collect the waste material for disposal. Closely related reference numerals are utilized to identify similar elements in the system.

Four waste material generating stations 102, 112, 114 and 116 are illustrated. Station 102 has an exhaust hood 104 which collects the waste material in that area and transmits it through duct 106 to the inlet of fan 150. Waste material generating station 112 has an exhaust hood 118 which collects waste material and transmits it through duct 124 to the inlet of fan 122. This fan then forces the air mass and waste material through duct 128 to the inlet of fan 130. Waste material generating station 116 has an exhaust hood 134 which collects the waste material at that station and delivers it through duct 132 to the inlet of fan 130. Waste material generating station 114 has an exhaust hood 146 which collects the waste material at that generating station. This material is delivered through duct 148 to the inlet of fan 150. The air mass and waste material passing through the fan 150 is delivered through duct 152 to the inlet of fan 144. The air mass and waste material entrained therein passing through the fan 130 is delivered through duct 136 to the inlets of the cyclones 138. The waste material separated out by the cyclones is transmitted through duct 140 to the inlet of fan 144. Duct 140 has a bell mouth 142. Bell mouth 142, like bell mouth 42, relieves the static pressure of the fan and is of particular value when the one or more of the cyclone chutes become plugged. It also provides entraining air. The waste material passing through fan 144 is conducted through duct 154 to the entry of bag house 174. Bag house 174 may be of the continuous type or the intermittent removal type. If it is of the intermittent removal type it will have a rotary air lock 186 at the base of the bag house for intermittent removal of waste material. The bag house is provided with a balancing fan 184. This fan, similar to balancing fan 84 of FIG. 1, exhausts clean air to the atmosphere. It also balances the pressure in the bag house so that the pressure coming into the bag house is equal to the pressure going out of the bag house. An intermittent type bag house may be of the reverse flush type wherein compressed air is blown back into the bag house so that heavy waste material falls downward, or it may be a shaker type wherein the bags are shaken to release the waste material collected thereon, the waste material then falling downwardly into hoppers in the bag house. Fan 190 is arranged to supply a flow of air which will entrain waste material from bag house 174 in duct 188. Duct 188 is connected to the inlet of valve 156. This valve is similar to valve 56. It has an inlet and two outlets. One outlet is connected to duct 158 and the other outlet is connected to duct 160. The valve is so arranged that the air mass and waste material in duct 188 may be directed either to duct 158 or duct 160. It is illustrated in FIG. 2 as being connected to duct 158. The waste material and air mass then flows to the inlet 166 of the unit 164. This unit is similar to the bag and container 64 of FIG. 1 and described above in some detail. The outlet 168 of unit 164 is connected to the bag exhaust hood 170. Air flow with some slight amount of waste material retained therein and not deposited in the bag unit 164 passes through hood 170 and into duct 172, where it is conducted to the inlet of fan 144, joining with the air flow and waste material in duct 152. If valve 156 is arranged so that duct 188 is connected to duct 160, the waste material and air mass enters inlet 176 of unit 162. The waste material is collected in the bag of that unit and the air mass, with small amounts of waste material entrained therein, passes through bag outlet 178 into exhaust hood 180. It is then transmitted through duct 182 to the inlet of fan 144, where it is joined by material from ducts 152, 140 and 172. The waste material 192 collected in unit 162 is illustrated as substantially filling the bag of that unit so that valve 156 has been changed to direct the flow of air mass and waste material into unit 164. A small amount of waste material 194 is illustrated as having been collected in unit 164.

Figure 3:
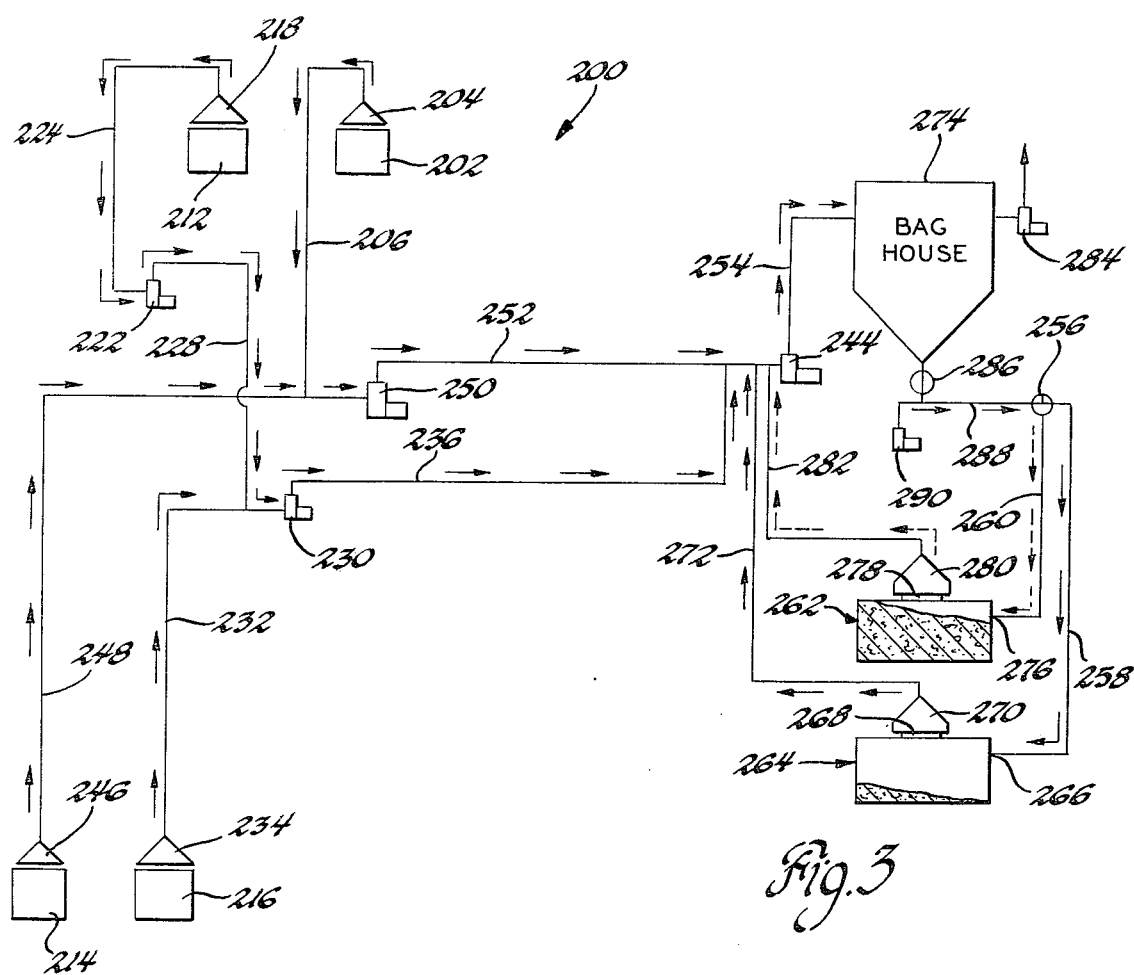

The system 200 shown in FIG. 3 is somewhat similar to the system shown in FIG. 2, but without using any of the cyclones. Due to the similarity of elements of the system, closely related reference numerals are utilized in identifying the various elements of the system of FIG. 3. Waste material generating station 202 has waste material collected therein through exhaust hood 204 and transmitted through duct 206 to the inlet of fan 250. Waste material from generating station 212 is collected by exhaust hood 218 and transmitted through duct 224 to the inlet of fan 222. Fan 222 blows the air mass and entrained waste material through duct 228 to the inlet of fan 230. Waste material generating station 216 has its waste material collected by exhaust hood 234 and transmitted through duct 232 to the inlet of fan 230. Waste material generating station 214 has its waste material collected by exhaust hood 246, the air mass and entrained waste material then being transmitted through duct 248 to the inlet of fan 250. The outlet of fan 230 transmits the air mass and entrained waste material through duct 236 to the inlet of fan 244. Similarly, the outlet of fan 250 transmits air and entrained waste material through duct 252 to the inlet of fan 244. The exhaust of fan 244 transmits the air mass and entrained waste material through duct 254 to the inlet of bag house 274. If the bag house is of the intermittent type, it is provided with a rotary air lock 286 at its base. It is also provided with a balancing fan 284, which exhausts clean air to the atmosphere and maintains a pressure balance between the air coming into the bag house and the air being exhausted from the bag house. When air lock 286 is opened, it permits the waste material collected in the bag house to be entrained in air passing from fan 290 through duct 288 to the selector valve 256. This valve has two outlets, one connected with duct 258 and the other connected with duct 260. Duct 258 is illustrated as being the duct which is currently receiving air mass and entrained waste material from duct 288. The air mass and entrained waste material is conducted though duct 258 to the inlet 266 of the disposable bag and bag retainer unit 264. Waste material is collected in the bag of this unit, as earlier described, and air is passed through the outlet 268 of the bag to the bag exhaust hood 270. This air, and small amounts of entrained waste material which did not settle in unit 264, are transmitted through duct 272 to the inlet side of fan 244. Thus, the waste material will again pass through the bag house 274 and be captured in one of the units 262 or 264. Unit 262 is illustrated as being substantially filled with waste material and disconnected by means of valve 256 so that it no longer receives air and waste material through duct 260. Unit 262 may therefore be removed from the system and, as will be described, transported to a disposal area and the disposal bag with the waste material therein disposed of. Another unit is installed in the same position and is available to be filled with waste material as soon as unit 264 is filled. When unit 262 is being filled, the air mass and entrained waste material in duct 288 is transmitted through valve 256 and duct 260 to the inlet 276. As earlier described, the waste material is deposited in the disposable bag of unit 262. The air mass, at a low velocity, and with any small amount of waste material still entrained, passes through the bag outlet 278 and the bag exhaust hood 280 to duct 282. This duct delivers the air and the small amount of entrained waste material to the inlet of fan 244. Thus, the air and entrained waste material is again circulated through bag house 274. The waste material separated in the bag house is then again permitted to be separated from the entrained air and deposited in one of the units 262 or 264. In this system the bag house has a relatively unlimited capacity. For example, when the units 262 and 264 are of such a size as to handle air at the rate of 5,000 cubic feet per minute, the bag house 274 may have a capacity on the order of 20,000 cubic feet per minute. By having a sufficiently large bag house, it has been found that the cyclones illustrated in FIGS. 1 and 2 are not needed.

Figure 4:
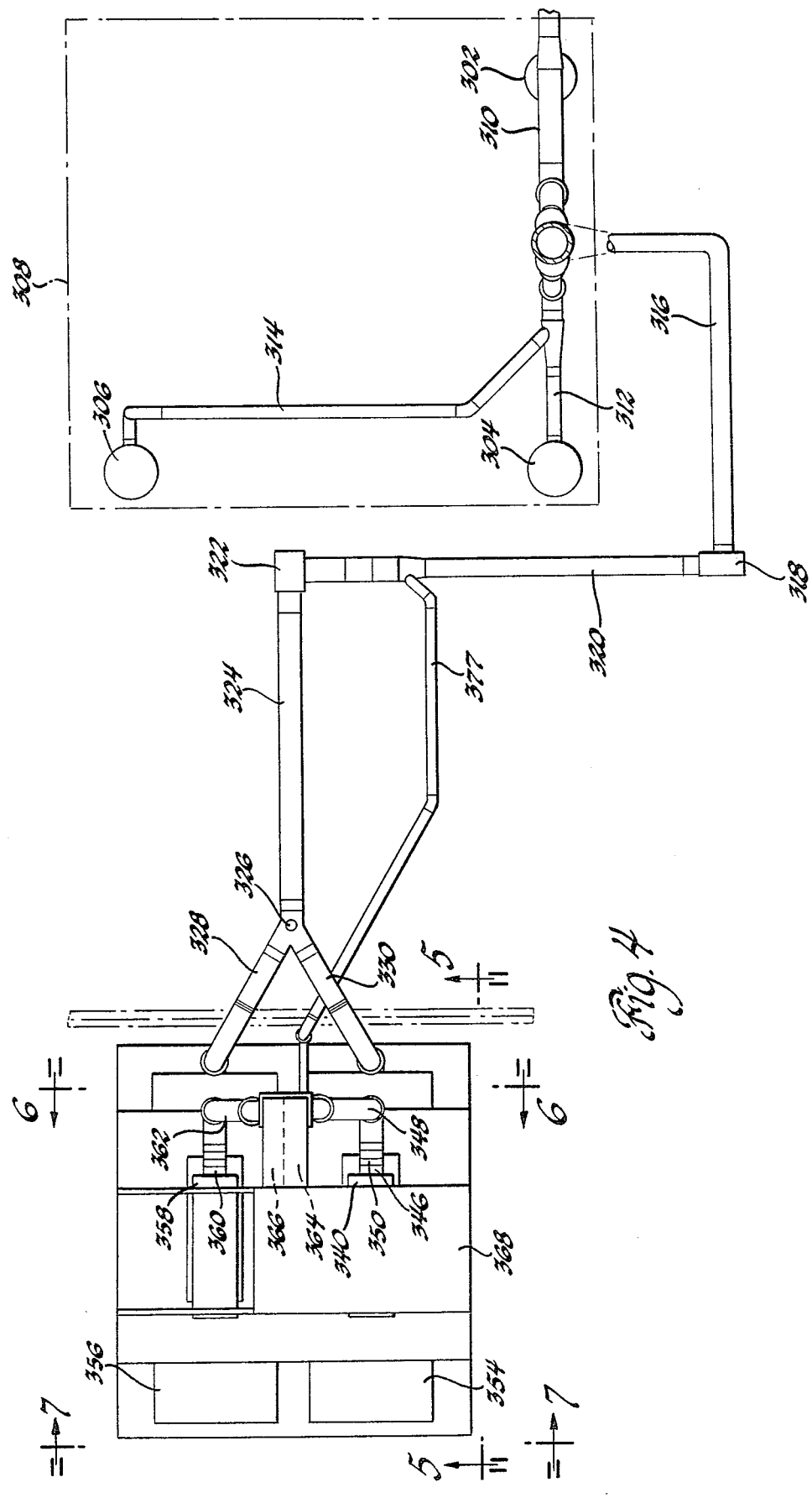
FIG. 4 is a plan view of a system embodying the invention, with parts broken away and in section.

FIGS. 4, 5, 6 and 7 are a somewhat more a mechanical representation of portions of a system embodying the invention and illustrating a typical arrangement of various elements of the system. FIG. 4 illustrates the provision of several work stations 302, 304 and 306 in a department 308 of an operational manufacturing facility which has waste material generated at the work stations noted. Ducts 310, 312 and 314 respectively collect waste material from the work stations 302, 304 and 306, transporting air mass and entrained waste material to a common duct 316. The air mass and entrained waste material passes through fan 318 and is blown through duct 320 to the inlet of fan 322. Fan 322 forces the air mass and entrained waste material through duct 324 to a Y-valve 326. This valve is operated to direct the air mass and entrained waste material either to the duct 328 or to duct 330. As is better seen in FIG. 5, duct 330 is connected to the inlet collar 332 of the disposable bag 334. Bag 334 is mounted in a rigid bag container 336 to support the bag. Container 336 also acts as a support while transmitting the bag to the disposal site. The air mass and the entrained waste material enters the interior of bag 334 at a high velocity and the velocity is immediately reduced as the air and entrained waste material passes into the bag. The waste material therefore settles out in the bag. The air, with small amounts of waste material entrained, will pass out through the bag outlet sleeve 338 and into the bag exhaust hood 340. The exhaust hood 340 is illustrated as having windows 342 provided therein so that the exhaust hood may be regularly inspected. A work platform 344 permits operators of the system to inspect the exhaust hood and also to connect and disconnect sleeve 338 from the exhaust hood each time the bag is installed or removed. The exhaust hood has an outlet 346 connected to a duct 348 through a slide gate 350. The slide gate is operated by a slide gate motor 352. The slide gate is open when the particular bag and container unit connected to that particular exhaust hood is being used to collect waste material. When the bag is filled, the slide gate is closed by energizing the slide gate motor, thereby disconnecting the outlet side of the bag from the remainder of the system. At the same time, valve 326 is shifted so that the unit 354 formed by bag 334 and container 336 no longer receives air and entrained waste material from the remainder of the system. When unit 354 is so disconnected, the unit 356 is connected to be operable in the system. Unit 356 is also connected to its own exhaust hood 358. Hood 358 has an outlet 360 similar to outlet 346 and also provided with a motor operated slide valve. Outlet 360 is connected to duct 362. Duct 348 and 362 are connected to the bag house inlets 364 and 366, respectively. These inlets lead to the interior of bag house 368. As earlier discussed, the bag house may have a rotary air lock at the base of the bag house. Rotary air lock 370 is at the bottom of chutes 372 and 374 where the chutes join to a common area. These chutes conduct waste material from the bag house hoppers 376 and 378, respectively. The waste material separated by the bag house from the air flow is captured in the hoppers and held therein, passing through the chutes to the rotary air lock. When rotary air lock 370 is opened and the bag house is flushed or shaken, the waste material passes through the rotary air lock and into duct 377. This duct joins with duct 320 so that the waste material and air, entrained in duct 377 through bell mouth 379, are transmitted to the inlet side of fan 322. Thus, the waste material is then transported to one of the units 354 or 356 and is deposited in the bag of the unit to which it is transmitted.

Figure 9:
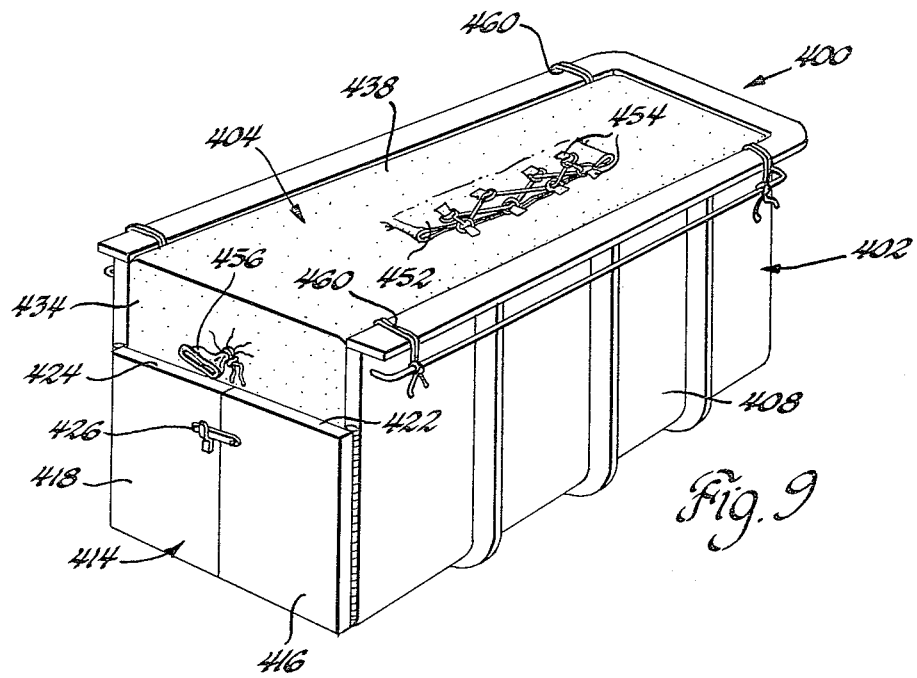
FIG. 9 is a perspective view of a bag and support form unit embodying the invention showing the bag full and the openings secured in a closed condition, the unit being ready for transport.
Figure 10:
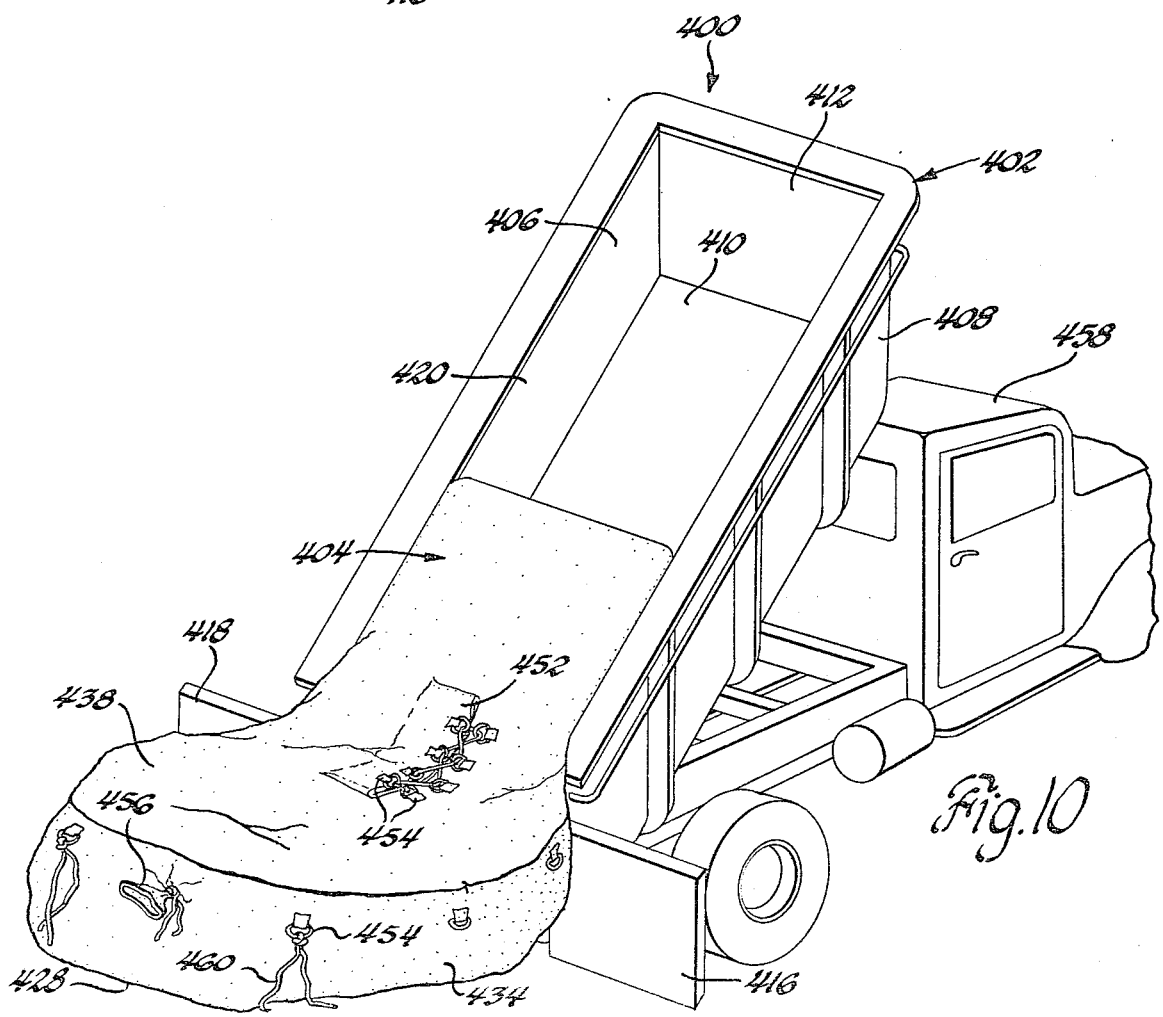
FIG. 10 is a perspective view showing a filled bag being dumped from the support form.

One of the bag and rigid container supports forming a unit is illustrated in greater detail in FIGS. 9 and 10. This unit may be unit 62 or 64 of FIG. 1, unit 162 or 164 of FIG. 2, unit 262 or 264 of FIG. 3, or unit 354 or 356 of FIG. 4. It is identified in FIGS. 8, 9 and 10 by reference numeral 400. Unit 400 is comprised of a rigid container 402 and a flexible disposable bag 404. Container 402 is formed with sides 406 and 408, a bottom 410, one end 412, and another end 414 made up of gates 416 and 418. The container has an open top 420. The upper ends 422 and 424 of gates 416 and 418 terminate below the open top 420 so that the sides of the rigid container extend somewhat above the gates. The gates are provided with a suitable latch 426.

The bag 404 is formed of a suitable material which is impervious to the passage of the air therethrough. Such a material may be a polypropylene or other suitable plastic, for example. It may have threads woven therein or supplied so as to increase the overall strength of the bag. The bag is an enclosure of generally rectangular shape, having a bottom 428, side walls or surfaces 430 and 432, end walls or surfaces 434 and 436, and a top or top surface 438. The edges of the various walls or surfaces, the top and the bottom, are secured together and tightly sealed so that no waste material will penetrate therethrough. The upper edge 440 of end wall 434, for example, is joined with the edge portion 442 of the top 438. An inlet opening 444 is formed through end wall 434 at the upper portion of the wall immediately adjacent but below the joint 446 formed by upper edge 440 and edge portion 442. An inlet collar 448 extends from end wall 434 and surrounds the inlet opening 444. Collar 448 provides for a suitable means of connecting the inlet opening 444 with a duct which conducts air mass and entrained waste material into the bag 404. An exhaust or outlet opening 450 is formed in the top 438 of the bag 404. Opening 450 is illustrated as being substantially oval in shape, extending longitudinally of the bag, and is much larger than inlet opening 444. It is preferable that it be on the order of ten times as large as opening 444. Opening 450 is surrounded by an outlet collar 452 which extends from top 438 and is adapted to be secured to the unit exhaust hood so that air mass and any entrained waste material which passes out of the bag will pass into the exhaust hood and not into the atmosphere. Various securing means 454 are provided on different portions of the bag 404. The securing means may, for example, be short webbing straps having secured thereto D-rings through which ropes may be passed to secure the bags in a manner to be described. When the bag is initially installed in the container support form 402, ropes 460 may be passed through at least some of the D-rings of the securing means found on the sides of the bag and tied to container rod 462 so as to cause the bag to hold its approximate shape inside the container 402. Other ropes may be passed through the D-rings of the securing means adjacent the outlet opening 450 so as to tie the collar 452 tightly about a portion of the unit exhaust hood. Similarly, a rope may be provided to secure the inlet collar 448 to a duct. When the bag 404 is filled with waste material to a sufficient extent to require removal and replacement, the collar 452 is detached from the unit exhaust hood. The inlet opening 444 is tied closed, as seen for example in FIG. 9 at 456. Collar 452 is also tied closed, and ropes may be used as lacing through the D-rings of some of the securing means 454 for this purpose. It is important that the collars be tightly tied so that no waste material may escape. The unit 400 is then placed on the chassis of a truck such as dump truck 458. The truck then transports the entire unit 400 to a disposal site. For example, this may be a land fill type of burial site. Upon arrival at the disposal site, the bag 404 is released from the rigid container support form 402 by untying or cutting ropes 460. Gates 416 and 418 are unlatched and swung open as illustrated in FIG. 10. The unit is then tilted in a dumping manner, best seen in FIG. 10, so that the bag 404 with the waste material secured tightly in it slides out of the container 402 and is deposited on the ground at the disposal area. The bag with the waste material therein may then be covered in a suitable and approved manner at the disposal site. The truck with the container 402 on it is then returned to the manufacturing facility and another bag 404 is installed in the container. Thus, a new unit is provided and will be available for installation in a system when needed.

In instances where material being collected is incompatible with a plastic bag, a receptacle of a different material may be used. For example, in collecting hot fly ash, the bag-like receptacle may be made of metal and provided with appropriate couplings for the inlet duct and outlet hood. It may than be combined with the rigid support member to provide a single-element unit for transport of the material. The invention is therefore not necessarily limited to a plastic bag when the material being collected would damage the bag due to heat or other action. The invention also includes the process of removing the particles from the air stream.

The embodiments of the invention in which an exclusive property or privilege is claimed are defined as follows:

1. System for collecting solid particles entrained in a gas stream, said system comprising:

a solid particle receptacle made entirely of material impervious to a gas stream and having opposed ends and a top and a bottom and opposed sides joining said ends and top and bottom to define an envelope impervious to a gas stream, the length of said receptacle between said opposed ends being greater than its width between said sides or its height between said top and bottom, said receptacle having a gas stream entrance opening in the top part of one of said ends and facing toward the other of said ends, and an unrestricted gas stream exit opening in said top generally centrally disposed between and spaced from said ends and sides and having an effective area about ten times as great as the effective area of said entrance opening;

first conduit means for conducting a gas stream with solid particles entrained therein to said entrance opening and into the interior of said receptacle in a direction toward said other of said ends and at a predetermined first volumetric flow rate and a predetermined first velocity sufficient to keep the solid particles entrained in the gas stream until they pass through said entrance opening, the gas stream then slowing in velocity in said receptacle sufficiently to permit substantially all of the solid particles entering said receptacle to fall out of the gas stream and be deposited in said receptacle, said first conduit means extending from said one end and integral with said one end;

second conduit means for conducting the gas stream and any solid particles remaining entrained therein from the interior of said receptacle through said exit opening at substantially the same volumetric flow rate as said first volumetric flow rate and at a second upwardly directed velocity which is sufficiently less than said first velocity so that most of the solid particles still entrained in the gas stream in said second conduit means fall back into said receptacle through said exit opening and only a small portion of the solid particles entering said receptacle remain entrained in the gas stream, the values of the volumetric flow rate and the velocities depending at least in great part on the density of the solid particles, said second conduit means extending from the top of said receptacle and integral therewith in the form of an elongate collar.

2. System for collecting solid particles entrained in a gas stream, said system comprising:

a solid particle receptacle, said receptacle having a gas stream entrance opening and a gas stream exit opening and being impervious to the gas stream;

first conduit means for conducting a solid particle-containing gas stream to said entrance opening and into the interior of said receptacle at a predetermined first volumetric flow rate and a predetermined first velocity sufficient to substantially keep the solid particles entrained until they pass through said entrance opening;

second conduit means for conducting the gas stream and any solid particles not deposited in said receptacle from the interior of said receptacle via said exit opening at substantially the same volumetric flow rate as said first volumetric flow rate and at a second velocity which is sufficiently less than said first velocity so that only a small portion of the solid particles entering said receptacle remain entrained in the gas stream;

a bag house having bag means therein for receiving the gas stream from said second conduit means and passing the gas stream therethrough while trapping substantially all of the remaining solid particles entrained therein, said bag house discharging a substantially solid particle-free gas stream to exhaust;

and means for at least intermittently collecting and returning the solid particles trapped by said bag house bag means to said first conduit means and re-entraining them in the gas stream flowing in said first conduit means.

3. System for collecting solid particles entrained in a gas stream, said system comprising:

a disposable bag defining a solid particle receptacle, said bag having a gas stream entrance opening and a gas stream exit opening and being impervious to the gas stream;

first conduit means for conducting a solid particle-containing gas stream to said entrance opening and into the interior of said bag at a predetermined first volumetric flow rate and a predetermined first velocity sufficient to substantially keep the solid particles entrained until they pass through said entrance opening;

second conduit means for conducting the gas stream and any solid particles not deposited in said bag from the interior of said bag via said exit opening at substantially the same volumetric flow rate as said first volumetric flow rate and at a second velocity which is sufficiently less than said first velocity so that only a small portion of the solid particles entering said bag remain entrained in the gas stream;

a bag house having bag means therein for receiving the gas stream from said second conduit means and passing the gas stream therethrough while trapping substantially all of the remaining solid particles entrained therein, said bag house discharging a substantially solid particle-free gas stream to exhaust;

and means for at least intermittently collecting and returning the solid particles trapped by said bag means to said first conduit means and re-entraining them in the gas stream flowing in said first conduit means.

4. System for collecting solid particles entrained in a gas stream, said system comprising:

a disposable bag defining a solid particle receptacle having opposed ends and a top and a bottom and sides, its length between said opposed ends being greater than its width or height, said bag having a gas stream entrance opening at the top part of one of said ends and facing toward the other of said ends, and a gas stream exit opening in said top generally centrally disposed between said ends and said sides, said bag being impervious to the gas stream;

means receiving and supporting said bag and adapted for transport of said bag when filled with solid particles;

first conduit means for conducting a solid particle-containing gas stream to said entrance opening and into the interior of said bag at a predetermined first volumetric flow rate and a predetermined first velocity sufficient to keep the solid particles entrained until they pass through said entrance opening, the gas stream then slowing in velocity in said bag to permit the major portion of the solid particles entering said bag to fall out of the gas stream and be deposited in said bag;

second conduit means for conducting the gas stream and any solid particles not deposited in said bag from the interior of said bag upwardly through said exit opening at substantially the same volumetric flow rate as said first volumetric flow rate and at a second velocity which is sufficiently less than said first velocity so that only a small portion of the solid particles entering said bag remain entrained in the gas stream;

a bag house having bag means therein for receiving the gas stream from said second conduit means and passing the gas stream therethrough while trapping substantially all of the remaining solid particles entrained therein, said bag house discharging a substantially solid particle-free gas stream to exhaust;

and means for at least intermittently collecting and returning the solid particles trapped by said bag means to said first conduit means and re-entraining them in the gas stream flowing in said first conduit means.

5. System for collecting solid particles entrained in a gas stream, said system comprising:

a plurality of disposable bags each defining a solid particle receptacle, each of said bags having a gas stream entrance opening and a gas stream exit opening and being impervious to the gas stream;

first conduit means for selectively conducting a solid particle-containing gas stream to said entrance openings and into the interior of said bags at a predetermined first volumetric flow rate and a predetermined first velocity sufficient to keep the solid particles entrained until they pass through said entrance openings;

second conduit means for conducting gas stream and any solid particles not deposited in said bags from the interior of said bags upwardly via said exit openings at substantially the same volumetric flow rate as said first volumetric flow rate and at a second velocity which is sufficiently less than said first velocity so that only a small portion of the solid particles entering said bags remain entrained in the gas stream;

a bag house having bag means therein for receiving the gas stream from said second conduit means and passing the gas stream therethrough while trapping substantially all of the remaining solid particles entrained therein, said bag house discharging a substantially solid particle-free gas stream to exhaust;

means for at least intermittently collecting and returning the solid particles trapped by said bag means to said first conduit means and re-entraining them in the gas stream flowing in said first conduit means;

and means for selectively disconnecting at least any one of said bags from said first and second conduit means to permit the removal of a filled bag and its replacement by an unfilled bag while directing the solid particle-containing gas stream to any remaining bag or bags not so disconnected.

6. For use in a particle collector system, a disposable container providing a dropout box and final container of waste material and the like, said container comprising:
a bag defining a flexible envelope made entirely of material impervious to air and shaped so as to be adapted to fit in an elongated rigid container support form, said envelope having a top surface provided with an exhaust opening of substantially less area than said top surface, said envelope also having an end surface delineated in part by an upper edge joining an edge portion of said top surface, said end surface having an inlet opening formed therein adjacent said upper edge, said openings being positioned to require the flow of mass from the inlet opening through the outlet opening to make an upward turn of about 90 degrees;
an elongate outlet collar integral with and extending from said top surface and surrounding said exhaust opening and adapted to be connected in the particle collector system;
an inlet collar integral with and extending from said end surface and surrounding said inlet opening and adapted to be connected in the particle collector system to receive air-entrained material, said inlet opening being of a size accommodating flow of air and material entrained therein at a high linear flow rate and up to a predetermined maximum mass flow;
said exhaust opening being of a size accommodating mass flow out of said envelope at least up to said predetermined maximum mass flow at a low linear flow rate, the change in linear flow rate between said inlet opening and said exhaust opening occurring within said envelope being such that most of the material entrained in air flowing through said inlet opening settles downwardly by gravity within said envelope and to the extent that any material is still entrained in the air passing through said exhaust opening into said outlet collar substantially all of such still entrained material falls back through said exhaust opening and settles downwardly in said envelope, aided by the upward turn into said outlet opening, and the air mass flowing upwardly outward of said envelope through and beyond said outlet collar retains at most only a nominal amount of material entrained therein.

7. For use in a particle collector system, a dropout box and material removal unit comprising:
a rigid container support form having a bottom wall, side walls, end walls and an open top, one of said end walls being a gate and of a lesser height than said side walls and other end wall, said rigid container support form being adapted to be loaded on a truck as a cargo container for transport;
a bag made entirely of material impervious to air and defining a flexible envelope shaped to fit in said rigid container support form and having a bottom, side walls, end walls and a top;
said bag having an inlet opening formed in one of said bag end walls and a collar extending about said inlet opening from and integrally formed with said bag end wall, said inlet opening and said collar being higher than said gate to permit attachment of said collar to a part of the particle collector system to receive air-entrained material over said gate;
said bag also having an outlet opening formed in said bag top and an elongate collar about said outlet opening extending from and integrally formed with said bag top, said collar being adapted to be attached to a part of the particle collector system to exhaust air upwardly from said bag;
and securing means on the exterior of said bag, said bag being installed in said rigid container support form and secured therein by said securing means to hold said bag in substantially the same shape as the interior of said rigid container support form;
said unit being adapted to be transported to a storage site with some of said securing means closing said collars to close said openings, and said bag with material secured therein being removable from said rigid container support form so as to be able to be left at the storage site, said rigid container support form being reusable.

8. A process for removing solid particles from a particle-containing gas stream comprising the steps of:
(a) introducing the particle-containing gas stream into a particle container at a first volumetric flow rate and a first velocity,
(b) reducing the velocity of the particle-containing gas stream within the container and allowing most of the solid particles in the gas stream to settle in the container;
(c) removing the gas stream and any particles still contained therein from the container at a second volumetric flow rate substantially equal to the first volumetric flow rate and at a second velocity having a value in the range of about 1/10 to 1/50 the first velocity,
(d) passing the gas stream so removed through a particle collector including bag house means through which the gas stream must pass and removing substantially all of the remaining solid particles contained in the stream by collecting them in the bag house means,
(e) discharging the clean gas stream from the bag house means,
(f) and at least intermittently collecting the particles from the bag house means and entraining them in the particle-containing gas stream and recycling them through the particle container in accordance with step (a).

* * * * *